United States Patent
Hansson

(10) Patent No.: US 10,443,689 B2
(45) Date of Patent: Oct. 15, 2019

(54) GEAR TRAIN

(71) Applicant: Swepart Transmission AB, Liatorp (SE)

(72) Inventor: Hans Hansson, Agunnaryd (SE)

(73) Assignee: Swepart Transmission AB (SE)

( * ) Notice: Subject to any disclaimer, the term of this patent is extended or adjusted under 35 U.S.C. 154(b) by 56 days.

(21) Appl. No.: 15/555,492

(22) PCT Filed: Mar. 4, 2016

(86) PCT No.: PCT/SE2016/050178
§ 371 (c)(1),
(2) Date: Sep. 1, 2017

(87) PCT Pub. No.: WO2016/140618
PCT Pub. Date: Sep. 9, 2016

(65) Prior Publication Data
US 2018/0045278 A1    Feb. 15, 2018

(30) Foreign Application Priority Data

Mar. 4, 2015    (SE) ........................ 1550263

(51) Int. Cl.
*F16H 1/28*    (2006.01)
*F16H 1/48*    (2006.01)
(Continued)

(52) U.S. Cl.
CPC ......... *F16H 1/2836* (2013.01); *F16H 1/2854* (2013.01); *F16H 1/48* (2013.01); *F16H 19/04* (2013.01); *F16H 57/08* (2013.01)

(58) Field of Classification Search
CPC .... F16H 1/28; F16H 57/0424; F16H 57/0427; F16H 57/0479; F16H 57/0486; F16H 57/082; F16H 25/2204; F16H 48/08; F16H 48/22; F16H 57/021; F16H 57/043; F16H 57/0473; F16H 57/0482; F16H 15/28;
(Continued)

(56) References Cited

U.S. PATENT DOCUMENTS 644,527 A    2/1900    Lytel
837,125 A    11/1906    Riotte
(Continued)

FOREIGN PATENT DOCUMENTS

DE    10 2004 006723 A1    9/2005
DE    102015002029 A1 *  8/2016    ............... F16H 1/22
(Continued)

*Primary Examiner* — Jacob S. Scott
*Assistant Examiner* — Murad Jahmani
(74) *Attorney, Agent, or Firm* — Condo Roccia Koptiw LLP

(57) ABSTRACT

The present disclosure relate to a gear train comprising an input and an output wherein power is transferred between input and output via two or more gears (13) in parallel, such as a planetary gear train. Each of the two or more gears (13) are bevelled, and arranged to rotate about a respective gear shaft (15), and each of the gears (13) are displaceable in the axial direction of its gear shaft (15). An equalizing arrangement (25) is provided that interconnects the gears (13) such that they are subjected to a similar force of application in their respective axial directions.

16 Claims, 3 Drawing Sheets

(51) Int. Cl.
  *F16H 57/08* (2006.01)
  *F16H 19/04* (2006.01)
(58) Field of Classification Search
  CPC ........ F16H 15/40; F16H 15/50; F16H 15/503;
    F16H 15/52; F16H 19/04; F16H 1/145;
    F16H 1/16; F16H 1/2836; F16H 1/2854;
    F16H 1/48; F16H 2009/166; F16H
    2037/088; F16H 2037/101; F16H
    2048/108; F16H 2057/0213; F16H
    2057/127; F16H 2061/0034; F16H
    2061/0037; F16H 2063/3093; F16H
    2200/0065; F16H 2200/2012; F16H
    2200/2046; F16H 2200/2064; F16H
    2200/2094; F16H 37/084; F16H 37/0853;
    F16H 37/086; F16H 3/006; F16H 3/66;
    F16H 48/11; F16H 48/19; F16H 48/32;
    F16H 48/34; F16H 55/24; F16H 55/563;
    F16H 57/038; F16H 57/0432; F16H
    57/0446; F16H 57/0471; F16H 57/0489;
    F16H 57/08; F16H 57/12; F16H 61/0021;
    F16H 61/0025; F16H 61/0403; F16H
    61/662; F16H 61/6624; F16H 61/66259;
    F16H 61/6649; F16H 61/702; F16H
    63/067; F16H 63/30; F16H 63/3026;
    F16H 9/04; F16H 9/16; F16H 9/18; F16H
    9/24
  See application file for complete search history.

(56) References Cited

U.S. PATENT DOCUMENTS

| | | | |
|---|---|---|---|
| 2,231,784 A * | 2/1941 | Von Thungen | F16H 1/2836 |
| | | | 123/70 V |
| 3,513,715 A | 5/1970 | Whitfield | |
| 4,524,643 A | 6/1985 | Ziegler et al. | |
| 5,239,880 A * | 8/1993 | Hawkins | F16H 1/222 |
| | | | 74/406 |
| 7,568,993 B2 | 8/2009 | Shulz et al. | |
| 2013/0263452 A1 | 10/2013 | Fitzgerald et al. | |
| 2016/0327123 A1* | 11/2016 | Hederstad | F16H 1/2836 |
| 2017/0254389 A1* | 9/2017 | Lau | F16H 1/2836 |
| 2017/0307061 A1* | 10/2017 | Gravina | F02C 7/36 |

FOREIGN PATENT DOCUMENTS

| | | |
|---|---|---|
| EP | 0 084 197 A1 | 7/1983 |
| WO | WO 88/03105 A1 | 5/1988 |

* cited by examiner

GEAR TRAIN

CROSS REFERENCE TO RELATED APPLICATIONS

This application is the National Stage Entry under 35 U.S.C. § 371 of Patent Cooperation Treaty Application No. PCT/SE2016/050178, filed 4 Mar. 2016 which claims the benefit of Sweden Application No. 1550263-6, filed 4 Mar. 2015, the disclosures of which are incorporated herein by references in their entirety.

TECHNICAL FIELD

The present disclosure relates to a planetary gear train comprising an input and an output wherein power is transferred between input and output via a central gear, two or more planet gears and an outer ring gear in parallel.

BACKGROUND

Gear trains with gear that run parallel are used in various systems. For instance, planetary gear trains often employ three or more planet gears that connect to a ring wheel at separate locations to convey power.

One problem with gear trains of the initially mentioned type is that they require components with high tolerances and often must be considerably over-dimensioned compared to what would be needed in an ideal realisation. Therefore gear trains of the initially mentioned type are often expensive.

SUMMARY

One object of the present disclosure is therefore to provide a gear train that can be less costly and still have a considerable capacity in terms of transferred power. This object is achieved by means of a gear train as defined in claim 1. More specifically, in a gear train of the initially mentioned kind, each of the two or more planet gears are beveloid gears, and are arranged to rotate about a respective gear shaft, each of the planet gears are displaceable in the axial direction of the gear shaft, and an equalizing arrangement, that interconnects the planet gears, such that they are subjected to a similar force of application in their respective axial directions. Thanks to this arrangement, the load will be more or less evenly distributed between the parallel gears. This increases the capacity of a given gear train, such that it can be used to transfer more power. Alternatively, tolerances can be less demanding. The result is a more efficient and/or less expensive gear train.

The gear shafts may be influenced by the pressure in a chamber, and the equalizing arrangement may include a hydraulic or pneumatic conduit arrangement interconnecting said chambers, such that they have the same axial force.

According to one embodiment the planetary gear train comprises at least four planet gears and said equalizing arrangement comprises a mechanical force balancing device, said force balancing system comprising at least one substantially rigid member and being connected to a support structure at a central pivot point. The force balancing system may be connected to the planet holder of the planetary gear train.

In this embodiment the axial force on the bevelled planet gears are balanced by the mechanical force balancing system, which may be a mechanical linkage or a rigid body arrangement, and there is thus no need for a hydraulic or pneumatic conduit arrangement. The axial force on the bevelled planet gears are balanced such that equal load in each planet gear mesh is achieved. A mechanical equalizing arrangement may thus be used instead of a hydraulic or pneumatic arrangement, which provides for a very robust and cost efficient solution. Especially, such a mechanical force balancing system is advantageous in situations where the planet holder of the planetary gear rotates, where no hydraulic system is available and where it is complicated to connect a hydraulic system, e.g. in hub reduction gears in heavy vehicles.

According to one embodiment the force balancing system comprises a mechanical linkage which is connected to the support structure via a revolute joint.

The mechanical linkage may comprise a first lever which is pivotable around a central pivot axis, a second and a third lever which are pivotable around said first lever, each of said second and third levers being connected to one planet gear shaft on one side of said first lever and one planet gear shaft on an opposite side of said first lever, wherein said second and third levers are pivotally connected to said first lever at opposite sides of said rotational joint. The mechanical linkage may thus comprise three pivot joints. The mechanical linkage may be H-shaped in case the gear train comprises four planet gears and may have another shape in case the gear train comprises more than four planet gears.

According to one embodiment said rigid member interconnects said at least four planet gears and is connected to the support structure via a spherical joint. For instance, the rigid member may be connected to the support structure by means of a spherical roller bearing.

The rigid member may e.g. be a number of rods rigidly connected to each other so as to move together as a single unit or a disc-shaped element.

DETAILED DESCRIPTION

The present disclosure relates generally to gear trains where a common driving gear drives two or more driven gears. One example of such a gear train is an epicyclic gear train (or planetary gear train).

Figure 1:
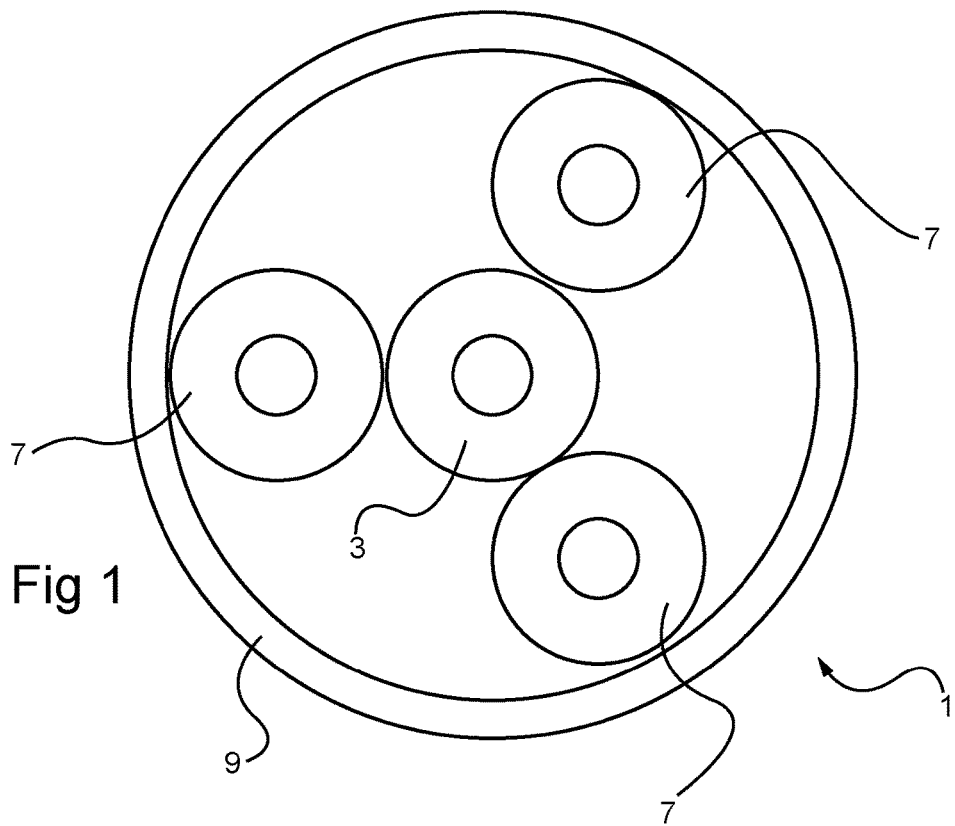
FIGS. 1 and 2 illustrate a planetary gear according to known art.
Figure 2:
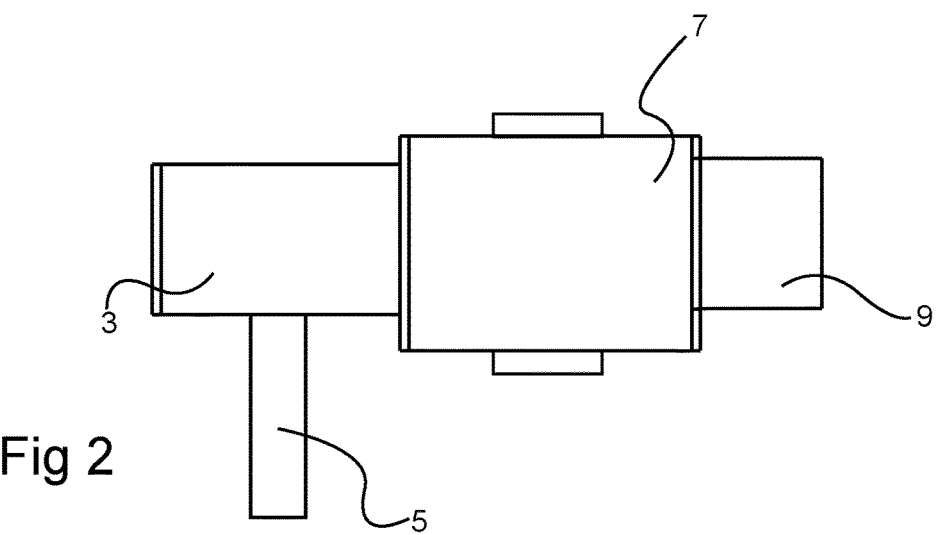

Epicyclic gear trains are often used to accomplish high overall gear ratios, and have a compact structure. FIGS. 1 and 2 illustrate schematically a planetary gear according to known art.

FIG. 1 shows a schematic front view of such a planetary gear 1 according to known art with a central driving pinion 3 constituting an input/-input shaft. The gear 1 may have an outer casing (not shown) that may be attached to a structure to provide a stationary reference point with regard to the operation of the gear train.

The illustrated gear train has three planet gears 7 attached to a common planet holder (not shown) and arranged with 120° spacing, although different angular spacings are possible. Although three planetary gears will be considered preferred in most applications a different number of planetary gears may be conceivable. One planetary gear 7 is shown in the schematic cross section of FIG. 2 where it interacts with the driving pinion 3 and and the outer ring gear 9.

As mentioned, the centrally located driving pinion 3 meshes with each planetary gear 7. Each of the planetary gears 7 further mesh, at different locations, with the outer ring gear 9. Either the planet holder or the ring wheel 9 is kept fixed with regard to the reference of the gear train, which means that the other part (the ring wheel or the planet holder) will be driven by the driving pinion 3 but at a much lower angular speed and constitutes the output. Of course, the gear may be reversed, such that the driving pinion is instead driven.

One problem associated with known planetary gears is due to that they transfer power from the driving pinion via more than one planetary gear and to the gear ring connected to the output shaft. The planetary gears will not necessary share the distributed power evenly among them, especially not for gear trains with more than three planet gears. Instead, one or more planetary gears may carry considerably more power than the other planetary gears. This gives the disadvantage that the more heavily loaded gear will have reduced life time than the others, and that the full transmission capacity of the gear train is not used. Therefore the gear train must be over-dimensioned as compared to an ideal gear train.

The uneven power distribution is mainly due to manufacturing tolerances. It would be possible to improve the distribution by using components with better tolerances. However, this would require high costs, and the problem still cannot be fully eliminated.

This problem can arise also in other gear trains where power is transmitted between different sets of gears in parallel.

Figure 3:
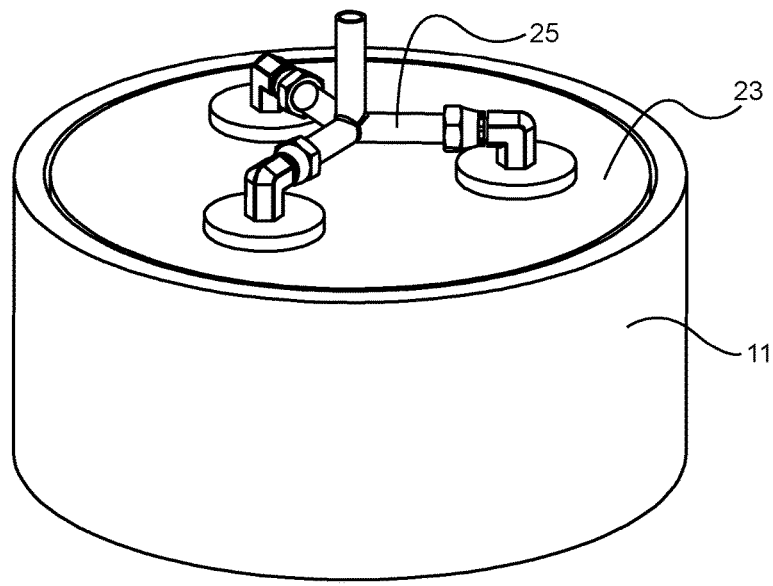
FIG. 3 shows an outer perspective view of a planetary gear train according to the present disclosure, and FIG. 4 indicates a cross section through that gear train.
Figure 4:
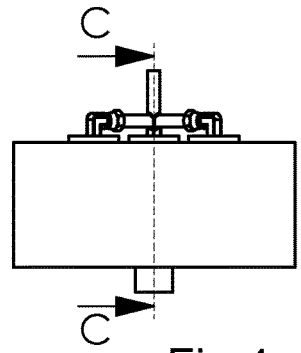
Figure 5:
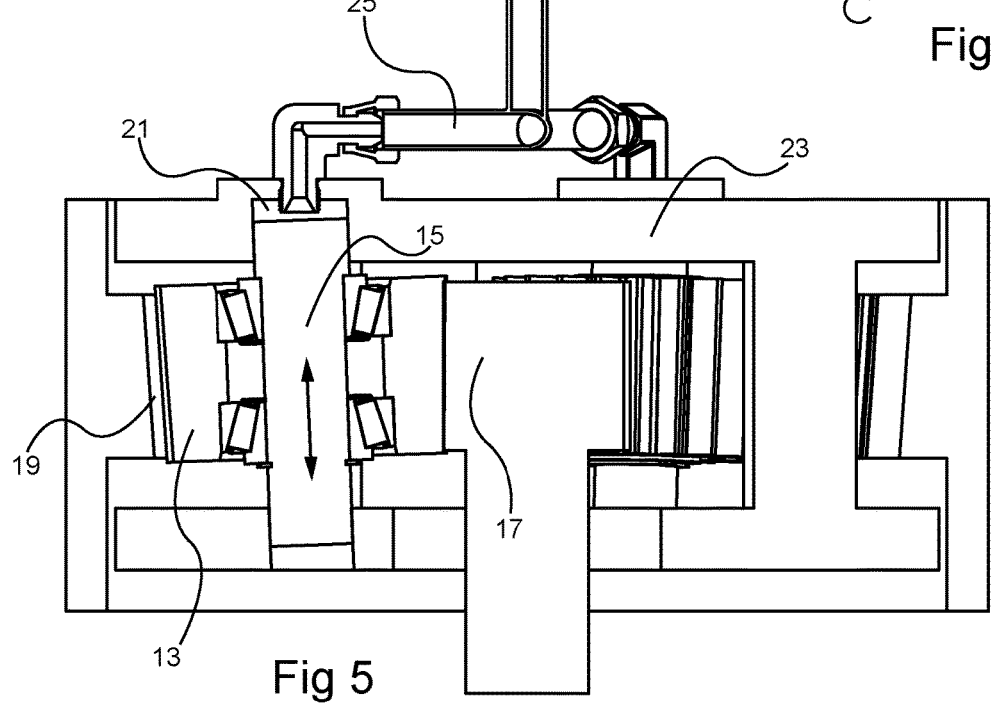
FIG. 5 shows, without hatchings, a the cross section indicated in FIG. 4.

In the present disclosure, this problem is obviated as follows with reference to FIG. 3 showing an outer perspective view of a planetary gear train 11 according to the present disclosure, FIG. 4 indicating a cross section through that gear, and FIG. 5 showing this cross section.

To start with and with reference to FIG. 5, a beveled gear 13, also referred to as beveloid gear 13, is used in the component that is intended to carry an evenly distributed fraction of the transferred power (the planet gear in the case of a planetary gear train), instead of a cylindrical gear as shown in FIG. 2. That beveled gear is located on an axis and can be displaced in that axis' axial direction. In the illustrated planetary gear train, the planet gear 13 is thus beveled (frustoconical) and arranged by means of bearings to rotate around a planet shaft 15, which shaft can be displaced in its axial direction. Alternatively, the gear can be displaced on the gear shaft. In the illustrated case the planet shaft 15 axis is slightly angled with respect to the overall axial direction of the gear train, although this is not necessary. However, as the planet axis is angled in this way a more or less cylindrical driving pinion 17, constituting the input and being connected to an input shaft, can be used as the conicity of the planet gear 13 is compensated for. The outer ring wheel 19 is beveled to match the planet gear depending on the latter's beveling and axial direction. A beveled driving pinion can be considered as well.

In the conventional planetary gear of FIGS. 1 and 2 with cylindrical gears, it is more or less impossible to achieve an even load distribution, especially if more than three planet gears are used.

By using beveled gears, i.e. beveloid gears, and making sure that they are loaded axially with the same force a more or less exactly even load distribution can be achieved. The pressure with which the planet shafts 15 are urged towards the ring wheel is determined by the pressure in a fluid filled chamber 21 in the planet carrier 23 where the shaft functions as a piston. As is best illustrated in FIG. 3, the planet carrier 23 of the gear train is further provided with hydraulic conduits 25 that interconnect these chambers 21, which will consequently have the same pressure. The pressure may be the atmospheric pressure when the gear train is not loaded, but an overpressure may be considered as well and may also reduce play.

Consider a case where the gear train begins to rotate, and one of the planet gears carries most of the load. The load from the ring gear will then move that planet shaft towards the chamber to which it is connected, thereby increasing the pressure in that chamber. As the chambers are interconnected, the pressure in the other chambers rises as well which means that those chambers will begin pressing their planet shafts towards the ring wheel. Thus the planet gears of those shafts will take a larger part of the transferred load until the system is balanced, which occurs when all planet shafts are exposed to the same axial force. As in the known gear train, either of the planet carrier 23 or the ring gear 19 may constitute the output, the other being fixed.

Figure 6:
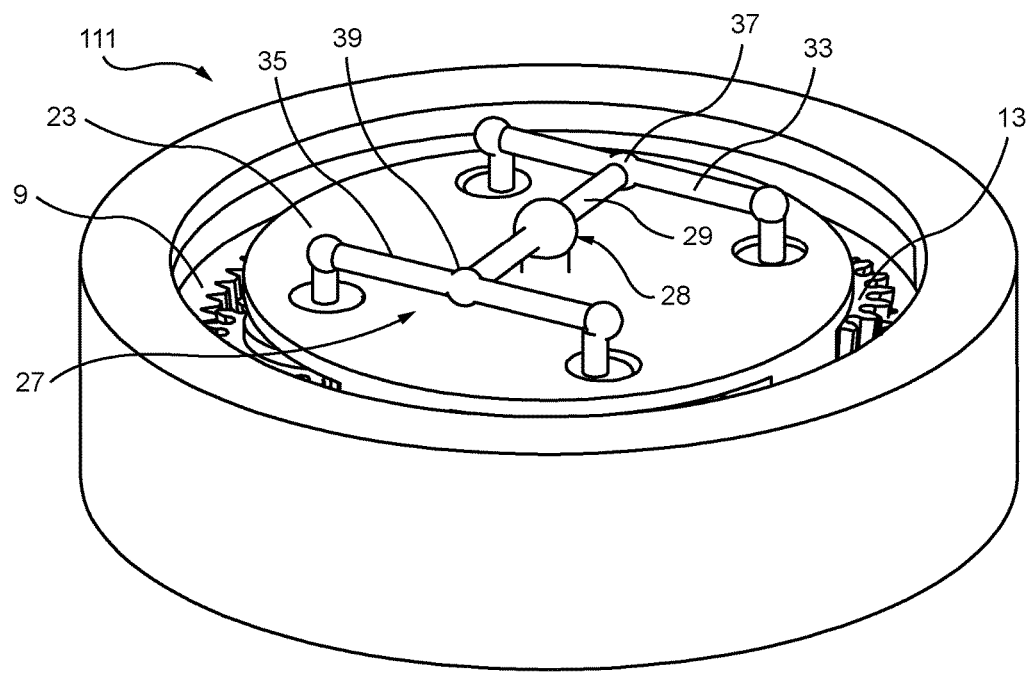
FIG. 6 shows an outer perspective view of a planetary gear train according to a second embodiment of the present disclosure.
Figure 7:
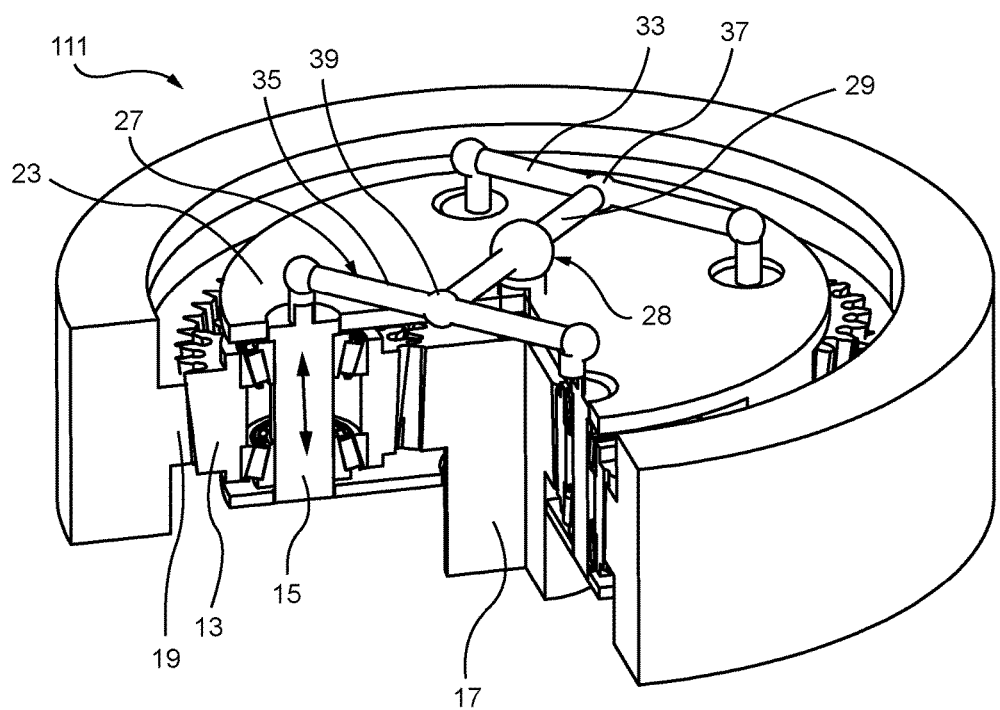
FIG. 7 shows a partly sectioned view of the planetary gear train shown in FIG. 6.

FIGS. 6-7 illustrate a gear train 111 according to a second embodiment of the present disclosure. Essentially all features disclosed in the first embodiment are also present in the second embodiment with reference numerals identifying similar or same features. Having mentioned this, the description will focus on explaining the differing features.

The gear train 111 according to this embodiment differs in that the equalizing arrangement includes a mechanical force balancing system, in the form of a mechanical linkage 27, instead of a hydraulic conduit arrangement. Furthermore, the planetary gear train 111 comprises a further beveled planet gear 13, i.e. a fourth planet gear 13. Hence, in this embodiment the gear train has four beveloid planet gears 13 attached to a common planet holder 23 and arranged with 90° spacing, although different angular spacings are possible. The mechanical linkage 27, which interconnects the planet gears 13, is connected to the planet holder 23 via a rotational joint 28 allowing rotation around a central pivot axis. The mechanical linkage 27 is arranged to distribute forces such that the same axial force is applied to each beveled planet gear 13. Thereby, equal torque share in every gear mesh may be achieved.

The mechanical linkage 27 comprises three levers. A first lever 29 is pivotally connected to the planet holder 23 via the rotational joint 28. The first lever 29 is thereby pivotable around a central pivot axis, that extends in the longitudinal direction of the first lever 29, but prevented from translatory movement relative to the planet holder 23. A second 33 and a third 35 lever are pivotally connected to the first lever 29 at opposite sides of the rotational joint 28. The second 33 and third 35 levers are pivotable around the first lever 29 but prevented from translatory movement relative thereto. Each of the second 33 and third 35 levers is connected to one planet gear shaft 15 on one side of said first lever 29 and one planet gear shaft 15 on an opposite side of said first lever 29, as shown in FIG. 7. In the illustrated embodiment, the mechanical linkage 27 thus comprises a central rotational joint 28, that allows the first lever 29 to pivot around a central pivot axis, and two further rotational joints 37, 39, each of which allows a respective lever 33, 35 to pivot around the first lever 29.

The first lever 29, which is arranged between the second 33 and third 35 levers, is perpendicular to each of the second 33 and third 35 levers. In the illustrated embodiment, the mechanical linkage 27 is H-shaped.

As the planet gears 13 are interconnected by the levers 29, 33, 35 of the mechanical linkage 27, the system will be balanced, which occurs when all planet shafts 15 are exposed to the same axial force.

The present disclosure is not restricted to the above illustrated example, and may be varied and altered in different ways within the scope of the appended claims. For instance, other types of planet gear trains exist where more than one ring wheel is used, and it is possible to adapt the disclosure to such gear trains.

As described hereinbefore with reference to FIGS. 3-5, the planet shafts may be angled with respect to the overall axial direction of the gear train in a way that enables a more or less cylindrical (non-beveled) driving pinion to be used. Alternatively, the planet shafts may be angled with respect to the overall axial direction of the gear train in a way that enables a more or less cylindrical (non-beveled) outer ring wheel. Then, the driving pinion is beveled to match the beveled planet gears.

Furthermore, it is appreciated that each of the driving pinion, the planet gears and the outer ring wheel may be beveled. This enables a planetary gear train in which the planet shafts are substantially parallel to the overall axial direction of the gear train.

According to one embodiment each of the gears of the planetary gear train is thus a beveloid gear and the planetary axes are parallel with the overall axial direction of the gear train.

It is however appreciated that the planetary shaft axes may be angled with respect to the overall axial direction of the gear train although each of the gears of the planetary gear train is a beveloid gear. According to one embodiment each of the gears of the planetary gear train is thus a beveloid gear and the planet shafts are slightly angled with respect to the overall axial direction of the gear train.

As described hereinbefore with reference to FIGS. 6-7, a mechanical force balancing system may comprise a mechanical linkage connected to a supporting structure via a joint that allows rotational movement around one single axis but prevent translatory movement. Alternatively, the mechanical force balancing system may be a substantially rigid body, such as, e.g., a number of bars rigidly connected to each other, or a disc-shaped element, connected to a support structure via a joint that allows free rotational movement but prevents translational movement.

The invention claimed is:

1. A gear train comprising:
    an input and an output, wherein power is transferred between the input and the output via two or more gears in parallel, wherein:
        each of said two or more gears are bevelled, and each of said two or more gears are arranged to rotate about a respective gear shaft,
        each of said two or more gears are displaceable in an axial direction of the gear shaft; and
    an equalizing arrangement that interconnects the two or more gears such that the two or more gears are subjected to a similar force of application in respective axial directions.

2. The gear train according to claim 1, wherein the gear train comprises a planetary gear train and said two or more gears each comprise a planet gear.

3. The gear train according to claim 1, wherein each respective gear shaft is influenced by a pressure in a respective chamber, and the equalizing arrangement comprises a hydraulic or pneumatic conduit arrangement interconnecting said respective chambers such that the respective chambers have the same internal pressure.

4. The gear train according to claim 2, wherein the planetary gear train comprises at least four planet gears, and said equalizing arrangement comprises a mechanical force balancing device, said mechanical force balancing device comprising at least one rigid member and said mechanical force balancing device being connected to a support structure via a rotational joint.

5. The gear train according to claim 4, wherein said mechanical force balancing device comprises a mechanical linkage that is connected to the support structure via said rotational joint.

6. The gear train according to claim 5, wherein the mechanical linkage comprises a first lever that is pivotable around a central pivot axis, and second and third levers that are pivotable around said first lever, wherein each of said second and third levers are connected to a first planet gear shaft on one side of said first lever and a second planet gear shaft on an opposite side of said first lever, wherein said second and third levers are pivotally connected to said first lever at opposite sides of said rotational joint.

7. The gear train according to claim 4, wherein said at least one rigid member interconnects said at least four planet gears and is connected to the support structure via said rotational joint.

8. The gear train according to claim 1, wherein the gear train comprises a linear gear train and at least one of said input or output comprises a rack gear.

9. A method for transferring power between an input and an output of a gear train, the method comprising:
    rotating a first gear of two or more gears about a first gear shaft, the first gear being bevelled and the first gear being displaceable in an axial direction of the first gear shaft;
    rotating a second gear of the two or more gears about a second gear shaft, the second gear being bevelled and the second gear being displaceable in an axial direction of the second gear shaft; and
    interconnecting the two or more gears in an equalizing arrangement such that the two or more gears are subjected to a similar force of application in respective axial directions.

10. The method according to claim 9, wherein the gear train comprises a planetary gear train and said two or more gears each comprise a planet gear.

11. The method according to claim 9, wherein each respective gear shaft is influenced by a pressure in a respective chamber, and the equalizing arrangement comprises a hydraulic or pneumatic conduit arrangement interconnecting said respective chambers such that the respective chambers have the same internal pressure.

12. The method according to claim 10, wherein the planetary gear train comprises at least four planet gears, and said equalizing arrangement comprises a mechanical force balancing device, said mechanical force balancing device comprising at least one rigid member and said mechanical force balancing device being connected to a support structure via a rotational joint.

13. The method according to claim 12, wherein said mechanical force balancing device comprises a mechanical linkage that is connected to the support structure via said rotational joint.

14. The method according to claim 13, wherein the mechanical linkage comprises a first lever that pivots around a central pivot axis, and second and third levers that pivot around said first lever, wherein each of said second and third levers are connected to a first planet gear shaft on one side of said first lever and a second planet gear shaft on an opposite side of said first lever, wherein said second and third levers are pivotally connected to said first lever at opposite sides of said rotational joint.

15. The method according to claim 12, wherein said at least one rigid member interconnects said at least four planet gears and is connected to the support structure via said rotational joint.

16. The method according to claim 9, wherein the gear train comprises a linear gear train and at least one of said input or output comprises a rack gear.

* * * * *